(12) United States Patent
Kawahara

(10) Patent No.: US 11,283,673 B2
(45) Date of Patent: Mar. 22, 2022

(54) BLOCKCHAIN ENDORSEMENT VERIFICATION

(71) Applicant: International Business Machines Corporation, Armonk, NY (US)

(72) Inventor: Ryo Kawahara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 16/241,843

(22) Filed: Jan. 7, 2019

(65) Prior Publication Data

US 2020/0220770 A1 Jul. 9, 2020

(51) Int. Cl.
| | |
|---|---|
| *G06F 15/16* | (2006.01) |
| *H04L 41/0654* | (2022.01) |
| *H04L 9/06* | (2006.01) |
| *H04L 41/069* | (2022.01) |
| *H04L 41/0893* | (2022.01) |

(52) U.S. Cl.
CPC ........ *H04L 41/0654* (2013.01); *H04L 9/0637* (2013.01); *H04L 41/069* (2013.01); *H04L 41/0893* (2013.01); *H04L 2209/38* (2013.01)

(58) Field of Classification Search
CPC .............. H04L 41/0654; H04L 41/069; H04L 41/0893; H04L 2209/38; H04L 9/0637
See application file for complete search history.

(56) References Cited

U.S. PATENT DOCUMENTS

| | | | |
|---|---|---|---|
| 9,967,238 B1 | 5/2018 | Hogan et al. | |
| 2017/0232300 A1* | 8/2017 | Tran ........................ | H04L 67/10 434/247 |
| 2017/0250972 A1 | 8/2017 | Ronda et al. | |
| 2018/0189100 A1* | 7/2018 | Nemoto ................. | G06F 9/5027 |
| 2018/0225448 A1* | 8/2018 | Russinovich .... | G11B 20/00282 |
| 2018/0227275 A1* | 8/2018 | Russinovich .......... | G06Q 20/00 |
| 2019/0018984 A1* | 1/2019 | Setty ....................... | H04L 63/14 |
| 2019/0129407 A1* | 5/2019 | Cella ....................... | G06N 3/084 |
| 2019/0171438 A1* | 6/2019 | Franchitti .............. | G06N 20/00 |

(Continued)

OTHER PUBLICATIONS

A. John et al.; "Parameterized Model Checking of Fault-tolerant Distributed Algorithms by Abstraction"; supported by the Austrian National Research Network S11403 and S11405 (RiSE) of the Austrian Science Fund (FWF) and by the Vienna Science and Technology Fund (WWTF) grants Proseed, ICT12-059, and VRG11-005; ISBN 978-0-9835678-3-7/13.

(Continued)

*Primary Examiner* — Razu A Miah

(57) ABSTRACT

An example operation may include one or more of receiving an input comprising an endorsement policy, a structure of a blockchain network, and requirements for degrees of faults to be tolerated, transforming the received input into intermediate data including identifiers of variables which represents fault states of the nodes of the blockchain network, and constraints on the fault states of the nodes by the endorsement policy and the requirements for degrees of faults to be tolerated, negating a subset of the constraints in the intermediate data, determining whether a blockchain which follows the endorsement policy and the requirements for the degrees of faults has blockchain-intrinsic properties based on all the possible fault states, and displaying results of the determination via a display screen.

18 Claims, 15 Drawing Sheets

(56) References Cited

U.S. PATENT DOCUMENTS

| | | | | |
|---|---|---|---|---|
| 2019/0303942 | A1* | 10/2019 | Balaraman | G06Q 20/4016 |
| 2019/0305938 | A1* | 10/2019 | Sandberg-Maitland | H04L 9/321 |
| 2019/0379699 | A1* | 12/2019 | Katragadda | G06N 3/006 |
| 2020/0119910 | A1* | 4/2020 | Ojha | H04L 9/3247 |
| 2020/0134066 | A1* | 4/2020 | Yegorin | H04L 9/3239 |
| 2020/0145189 | A1* | 5/2020 | Androulaki | G06F 9/54 |

OTHER PUBLICATIONS

C. Barrett et al.; "The SMT-LIB Standard—Version 2.0"; 2010.
J. Yin et al.; "Separating Agreement from Execution for Byzantine Fault Tolerant Services"; Laboratory for Advanced Systems Research Department of Computer Sciences; The University of Texas at Austin; SOSP'03; Oct. 19-22, 2003; Bolton Landing; New York; USA.
K. Rilee; "Understanding Hyperledger Fabric—Endorsing Transactions"; Koki; Medium.com/kokster; Feb. 10, 2018.
M. Vukolic; "Rethinking Permissioned Blockchains"; BCC'17 Apr. Feb. 2, 2017; Abu Dhabi; United Arab Emirates.
Anonymous; "Endorsement policies"; https"//github.com/hyperledger/fabric/blob/v1.0.5/docs/source/endorsement-policies.rst; last downloaded on Nov. 2, 2018.

* cited by examiner

FIG. 4B

Input Model 410

```
<?xml version="1.0" encoding="UTF-8" ?>
<ep-checker>
<endorsementPolicy>
    <t threshold="2">
        <t threshold="1" >
            <peer ref="org_a.p1" />
            <peer ref="org_a.p2" />
        </t>
        <t threshold="1" >
            <peer ref="org_b.p1" />
            <peer ref="org_b.p2" />
        </t>
</endorsementPolicy>
<network>
    <org id="org_a">
```

[Verify] [Clear]

Output 420

Verification Result

| Property | Result | Counter |
|---|---|---|
| Safety | False | Yes |
| Liveliness | False | Yes |

422

Counter Example: Liveliness

| Peer ID | State(e) | State(v) |
|---|---|---|
| Org A P1 | True | True |
| Org A P2 | False | False |
| Org A P3 | True | True |
| Org B P1 | True | False |
| Org B P2 | True | True |
| Org B P3 | True | True |

424

[Clear]

600

US 11,283,673 B2

BLOCKCHAIN ENDORSEMENT VERIFICATION

TECHNICAL FIELD

This application generally relates to blockchain development, and more particularly, to a system which verifies whether an implementation of a customizable endorsement policy satisfies blockchain properties.

BACKGROUND

A centralized database stores and maintains data at one location. This location is often a central computing system such as a server or a mainframe computer. Information stored on a centralized database is typically accessible from multiple different points. For example, multiple users or client workstations can work simultaneously on the centralized database based on a client/server configuration. Because of its single location, a centralized database is easy to manage, maintain, and control, especially for purposes of security. Within a centralized database, data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks can occur when the centralized database experiences high traffic. Furthermore, the centralized database provides limited access to data because only one active/productive copy of the data is maintained. As a result, multiple users may not be able to access the same piece of data at the same time without creating problems such as overwriting necessary data. Furthermore, because a central database has minimal to no data redundancy, if a set of data is unexpectedly lost can be difficult to retrieve other than through manual operation from back-up disk storage.

Across global supply chains, financial services, healthcare, government and many other industries, innovators are exploring ways to use blockchain to disrupt and transform traditional storage into a decentralized storage scheme. Many industry leaders have already achieved significant business benefits, including greater transparency, enhanced security, improved traceability, increased efficiency and speed of transactions, and reduced costs, through the use of blockchain storage.

Before data (e.g., transactions) may be stored on a blockchain, it must be approved by a consensus of nodes within the blockchain network. Hyperledger Fabric is a blockchain infrastructure that supports an application-specific, customizable consensus protocol (which is referred to as an endorsement policy) which can support diverse blockchain applications. However, because of the allowed customization, it becomes difficult to ensure that a blockchain network implementing the endorsement policy satisfies blockchain requirements such as Byzantine fault tolerance, and the like.

Accordingly, a mechanism is needed for verifying customizable endorsement policies and networks where they are implemented.

SUMMARY

One example embodiment may provide a system that includes one or more of a storage configured to store an input comprising an endorsement policy, a structure of a blockchain network, and requirements for a blockchain, and a processor configured to one or more of transform the input into intermediate data that includes fault states of nodes of the blockchain network, constraints on the nodes by the endorsement policy, and negated constraints on the nodes by the blockchain requirements, determine whether the endorsement policy satisfies the requirements for the blockchain requirements based on the transformed intermediate data, and display results of the determination via a display screen.

Another example embodiment may provide a method that includes one or more of receiving an input comprising an endorsement policy, a structure of a blockchain network, and requirements for a blockchain, transforming the received input into intermediate data including fault states of nodes of the blockchain network, constraints on the nodes by the endorsement policy, and negative constraints on the nodes by the blockchain requirements, determining whether the endorsement policy satisfies the blockchain requirements based on the intermediate data, and displaying results of the determination via a display screen.

Another example embodiment may provide a non-transitory computer readable medium comprising instructions, that when read by a processor, cause the processor to perform one or more of receiving an input comprising an endorsement policy, a structure of a blockchain network, and requirements for a blockchain, transforming the received input into intermediate data including fault states of nodes of the blockchain network, constraints on the nodes by the endorsement policy, and negative constraints on the nodes by the blockchain requirements, determining whether the endorsement policy satisfies the blockchain requirements based on the intermediate data, and displaying results of the determination via a display screen.

BRIEF DESCRIPTION OF THE DRAWINGS

FIG. 4B is a diagram illustrating an input and an output of a verification of a blockchain endorsement policy according to example embodiments.

DETAILED DESCRIPTION

Figure 1:
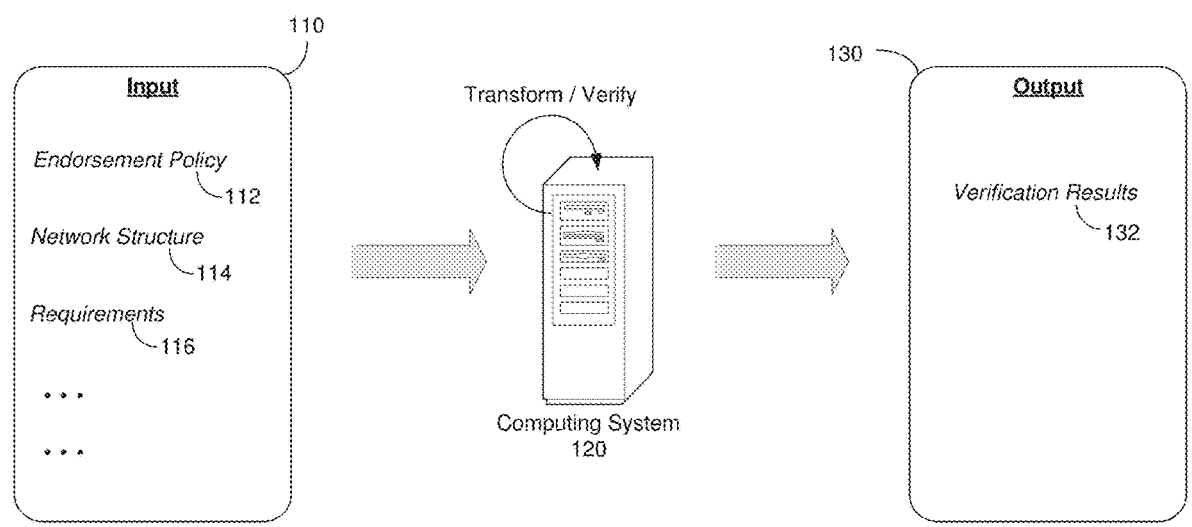
FIG. 1 is a diagram illustrating a process of a computing system verifying an endorsement policy according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which are capable of verifying a customizable consensus rule (also referred to as an endorsement policy) for a blockchain. A developer may use the embodiments described herein when developing the endorsement policy.

In these examples, the endorsement policy defines which participants (nodes) in a blockchain network that must endorse a transaction before it can be stored on a blockchain. Meanwhile, a consensus is broken into three phases, including endorsement, ordering, and validation. The consensus is a process where the nodes in the network provide a guaranteed ordering of the transaction and validating those block of transactions that need to be committed to the ledger. Consensus must ensure the correctness of all transactions in a proposed block, according to endorsement and consensus policies, an agreement on order and correctness and hence on results of execution (implies agreement on global state), and interface and depend on smart-contract layer to verify correctness of an ordered set of transactions in a block.

Consensus must satisfy two properties to guarantee agreement among nodes: safety and liveness. Safety means that each node is guaranteed the same sequence of inputs and results in the same output on each node. When the nodes receive an identical series of transactions, the same state changes will occur on each node. The algorithm must behave identical to a single node system that executes each transaction atomically one at a time. Liveness means that each non-faulty node will eventually receive every submitted transaction, assuming that communication does not fail. The example embodiments provide a verification mechanism which can determine whether an endorsement policy will satisfy safety and liveliness properties of a blockchain consensus protocol.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties may be referred to herein as peers or nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Examples of the endorsement polices are shown here. In one example, T(2, p1, p2, p3). In the above example, the function denoted as "T( . . . )" is called a threshold function. The first argument of the threshold function is a threshold, which defines the criteria of a consensus. The rest of the arguments consists a list of peer nodes. The endorsements from the peer nodes in the list are examined. If the number of the endorsements which contains the same execution result as a value exceeds the threshold, then the threshold function returns the endorsement. In total, this endorsement policy means that a consensus is made when there are two or more endorsements from the list of peers, p1, p2 and p3 and those endorsements are the same. The threshold function works like a voting; the threshold parameter corresponds to a quorum and the list of the peer nodes consist a set of voters. An endorsement policy can be further complicated by combining multiple threshold functions. For example, T(2, T(1, p1, p2), T(1, p3, p4)). In this case, a consensus is made when there are one or more endorsements from a group of peer nodes p1 and p2, and one or more endorsements from another group of peer nodes p3 and p4, and two endorsements from the threshold functions T(1, p1, p2) and T(1, p3, p4) and both endorsements are the same.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Recently developed blockchain platforms feature the capability to customize the consensus protocol (rules) in order to reflect the variations of the participants. Hyperledger Fabric is an example of a private blockchain platform which supports such a customization. In this type of infrastructure, a part of the consensus protocol is defined in an application-specific rule, so that a flexible weighting on votes from other nodes for a transaction result is possible. A similar mechanism can be also observed in some public blockchain platforms such as Ripple Protocol, Stellar Consensus Protocol, and the like. In these blockchain platforms, a node in a blockchain network can be configured to define a set of nodes with which the node makes an agreement.

However, there is a side effect in the customizable consensus protocol. In particular, an application developer needs to ensure that, when implemented, a customized consensus protocol satisfies properties which must hold true in a blockchain network for each application. An important requirement to a consensus protocol used in an untrusted network is the prevention of ledger tampering by the participants. This can be regarded as a Byzantine Generals problem. Therefore, Byzantine fault tolerance is required to such a protocol. This is why proof of work (PoW) or practical Byzantine fault tolerance (PBFT) is often used as the consensus protocol. However, in development of Hyperledger Fabric application, the platform supports a wide range of customization, which might lead to a lack of safety or liveness of its service in the existence of Byzantine fault nodes. Therefore, an application developer needs to verify the customized consensus rule in the design phase of the application. One can use a model checking tool or make an in-house simulation program to do the verification. However, since each application may have various fault modes and network structures, the system modeling and the development of a simulator have become burdens in a blockchain application development.

The example embodiments overcome these drawbacks by verifying that a consensus rule (referred to as an endorsement policy) satisfies some required properties (e.g., fault tolerance, etc.) that are typically expected to a blockchain, such as safety (a property that a wrong value will not be recorded to a ledger even if there are faulty nodes to some extent) and liveness (a property that an agreement is eventually made among the participant nodes even if there are faulty nodes to some extent). The number of the faulty nodes to be tolerated and its distribution are specified by the users of the blockchain (e.g., participants of the blockchain). Those are also parts of requirements to a blockchain-based application system.

Some benefits of the instant solutions described and depicted herein include guaranteeing that a consensus protocol and its endorsement policy will not malfunction at a later time as a result of a lack of safety or liveness. Furthermore, the embodiments can also help a developer when building the application because the system can provide hints when an endorsement policy does not satisfy either safety or liveness thereby improving the speed at which the software may be developed.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

According to various aspects, inherent blockchain properties such as consensus and endorsement are improved by the mechanisms described herein. Smart contracts are processed by pluggable program codes (e.g., chaincode) and the result (the output) of those programs are called endorsements. Since a blockchain is a decentralized/distributed system, one transaction (or a contract) is processed by multiple participant nodes, and some of them might return endorsements of wrong values (i.e., value faults), and some of them might not respond to the transaction (i.e., crash faults). Therefore, a consensus must be made on an endorsement among the nodes. The consensus protocol must provide I) safety and II) liveness even if there are faulty nodes to some pre-defined extent. Some blockchain platforms including Hyperledger Fabric support customization of the consensus rule, which is called an endorsement policy. The endorsement policy which fits the requirements must be specified by a developer of a blockchain-based application system.

In the example embodiments, the fault states of all the participant nodes in a blockchain system are examined against a given endorsement policy and whether the given requirements are met is checked. In order to explore the combinations of the faulty states exhaustively and effectively, formal methods are used. In these examples, participant nodes, a blockchain network structure, an endorsement policy and properties are modeled as mathematical constraints, and the state space is reduced by an SMT (Satisfiability Modulo Theory) solver with respect to the constraints. This verification of an endorsement policy can be executed before the endorsement policy is deployed to the blockchain network, i.e., during the design phase or at the beginning of the deployment.

FIG. 1 illustrates a process of a computing system 120 verifying an endorsement policy according to example embodiments. Referring to FIG. 1, an input 110 is provided to the computing system 120. Here, the input is a model which may include an endorsement policy 112, blockchain network structure 114 (organizations and nodes), and blockchain properties 116. For example, the input model 110 may be written in a human-readable text format such as XML, JSON, YAML, or the like. The syntax of the input model may be similar with the one used in the configuration files of a blockchain platform (e.g., Hyperledger Fabric).

The computing system 120 may transform (convert) the input model 110 into a set of variable declarations which describe the fault state space and mathematical constraints which constrain the fault state space to be explored. This set may be described in SMT Lib 2.0 script format, which is like a program code. To perform the transformation, the input model 110 may be processed by an Extensible Stylesheet Language Transformations (XSLT) processor accompanied with a XSL style sheet. XSLT is a general mechanism to convert an XML data into other format using a template-based rule and the XSL style sheet defines the rule.

In the example embodiments, the XSL style sheet may define how a list of nodes is transformed into a set of declarations of state variables which describe the types of faults (e.g., normal (correct) state, crash fault state, and value fault state) of the nodes. These states can be expressed in various ways, such as a pair of Boolean variables which correspond to whether an endorsement exists and whether the value of the endorsement is correct. The XSL style sheet may define how an endorsement policy and requirements for fault tolerance are transformed into a set of mathematical constraints on the variables. Furthermore, the XSL style sheet may include how properties for liveness and safety are transformed into a set of negation of constraints on the variables. The XSLT processor may output a text file in SMT Lib 2.0 format which may be processed by an SMT solver.

The result of the processing by the computing system 120 is an output 130 which can provide verification results 132 which may include a status of the endorsement policy (e.g., pass/fail) as well as counter-examples for node states when either liveness or safety properties are not satisfied by the endorsement policy. From this counter-example, a user can understand how node faults make the requirements unmet and it could be a hint for the improvement of the system design.

According to various embodiments, the purpose of the transformation is to use an SMT solver to verify the endorsement policy. An SMT solver solves a problem called a satisfiability problem. That is, it determines whether a given set of mathematical constraints can be satisfied at the same time by any set of values of the variables used in the constraints. The computing system 120 may transform the model into a problem of satisfiability, which can be checked by an SMT solver. If the problem is satisfiable, then the verification of the input model is a FAILURE. This is because the transformed constraints include the negation of the required properties (i.e., the SMT solver can find a set of fault states of the nodes where the endorsement policy is satisfied but at the same time the required properties are not satisfied). On the other hand, if the problem is unsatisfiable, then the endorsement policy is verified to be a successful policy. This process uses a negated constraint which results in the unsatisfiable result being a positive/successful outcome.

Figure 2A:
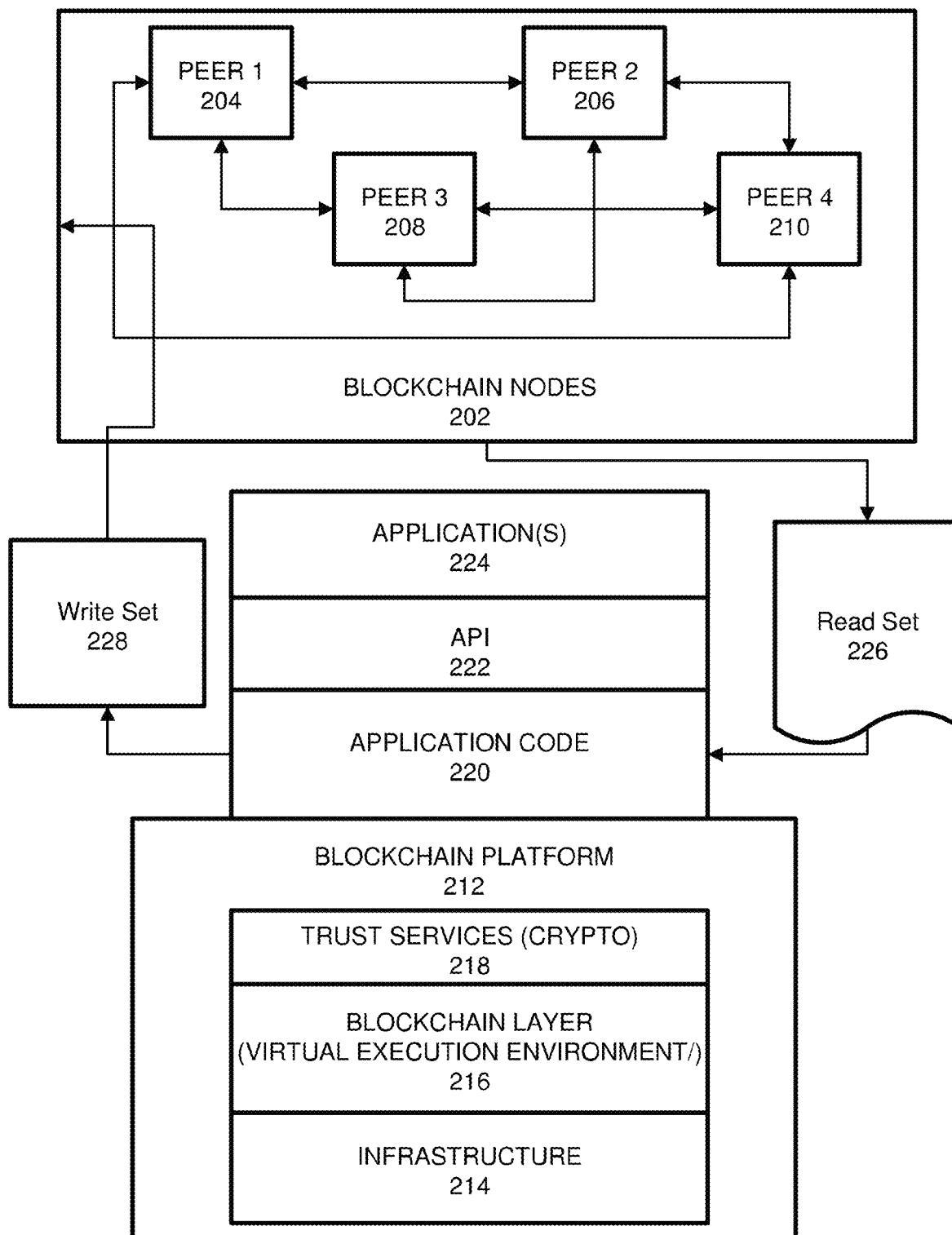
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on an endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In this example, a read set 226 may be processed by one or more processing entities (e.g., virtual machines) included in the blockchain layer 216. A write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified. According to various embodiments, the read set 226 may include a current processing step of the multi-party process. Meanwhile, the write set 228 may include the execution results of the processing step which may include an identification of the step, sending and receiving events performed during the processing step, and the like.

A chaincode may include the code interpretation of a smart contract, with additional features. As described herein, the chaincode may be program code deployed on a computing network, where it is executed and validated by chain validators together during a consensus process. The chaincode may be generated based on a plurality of state charts of a blockchain and a plurality of off-chain systems.

Figure 2B:
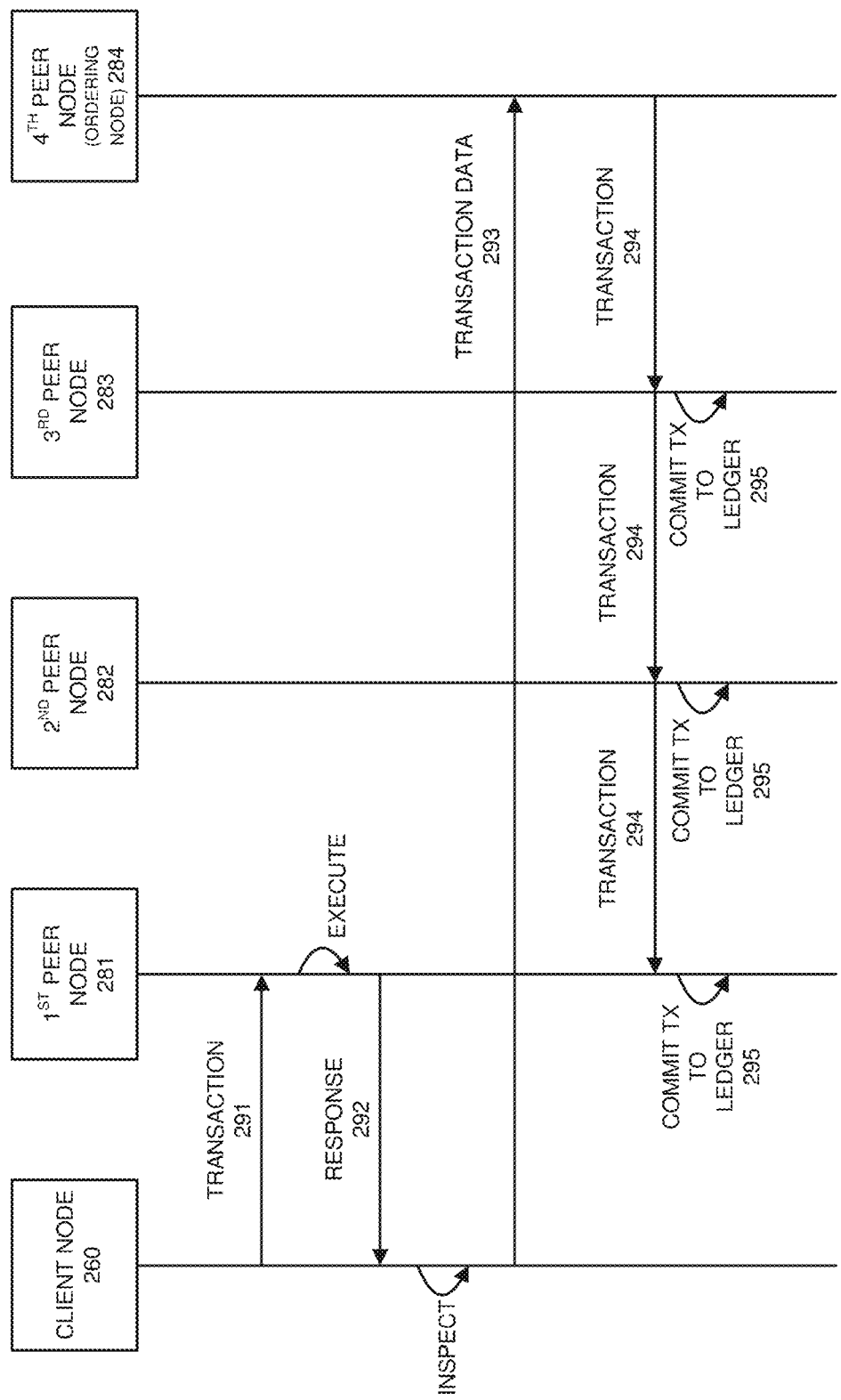
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. The transaction proposal 291 may include a request to store information about execution results of a sub-component of a software model. There may be more than one endorser, but one is shown here for convenience (i.e., peer node 281). The client 260 may include an application (e.g., web application, etc.) that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. According to various embodiments, the transaction results may include a result of executing a current step of the multi-party process. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID, as well as the timestamp information and multi-party process information described herein such as an identification of the current step executed, send and receive events performed during the step, and the like. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
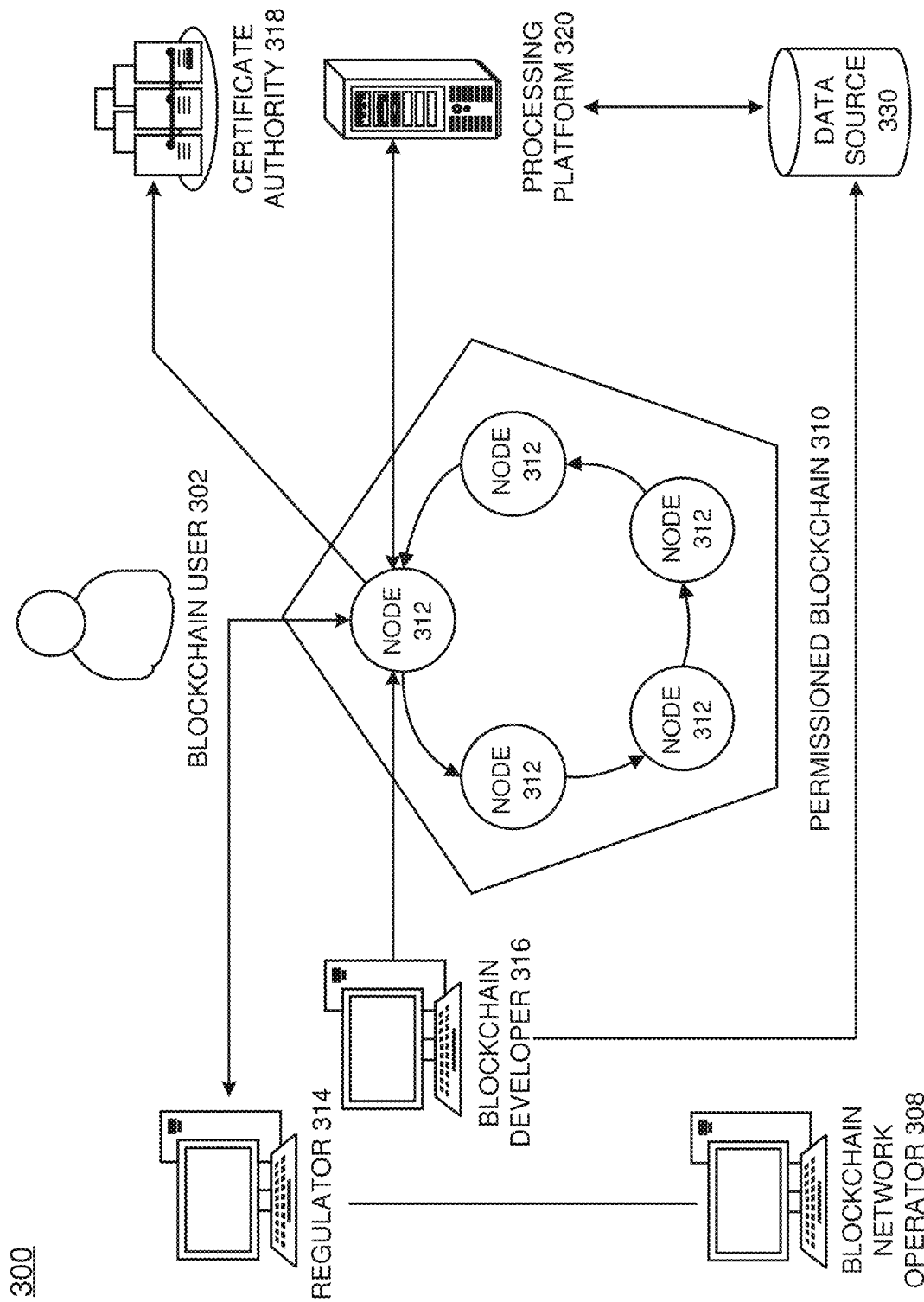
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310.

Figure 4A:
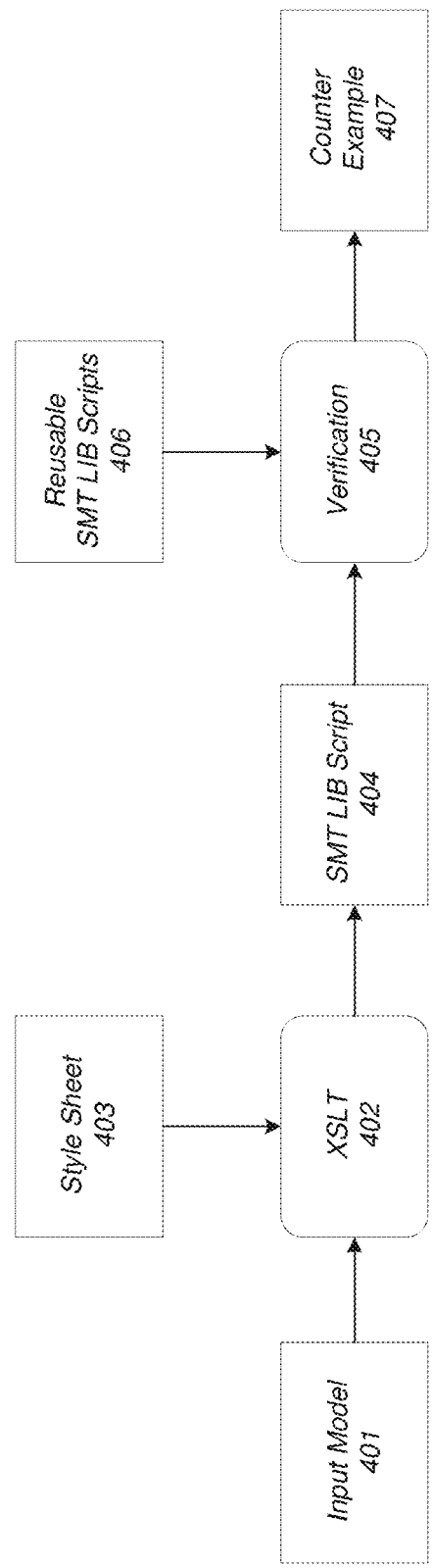
FIG. 4A is a diagram illustrating a process for verifying a blockchain endorsement policy according to example embodiments.

FIG. 4A shows an overview of a verification process 400 according to various embodiments. Referring to the example of FIG. 4A, the process 400 receives an input 401 which includes a model which describes and endorsement policy, a blockchain network structure, requirements on fault tolerance, and the like. The input model may be transformed, in 402, into a SMT library-based script 404 based on a style sheet 403. The SMT Library script 404 can be verified by an SMT solver in 405. During the verification in 405, the SMT solver may exhaustively explore the states which are needed for the verification based on reusable scripts in 406, and check whether the safety and the liveness of the given blockchain system hold. The output in 407 may be the result of the verification. Additionally, a counter example may be output in 407 when the verification fails in 406.

FIG. 4B illustrates a screen shot of an input 410 and a screen shot of an output 420. The input may be a model (e.g., in XML format, etc.) which includes information about the endorsement policy, network structure, and requirements for fault tolerance. In this example, the input window 410 may receive a file or it may receive code containing the model of the endorsement policy, the network, and the requirements. As an example, the following code is provided, however, embodiments are not limited thereto:

```
<?xml version="1.0" encoding="UTF-8" ?>
<ep-checker>
<endorsementPolicy>
    <t threshold="2">
        <t threshold="1" >
            <peer ref="org_a.p1" />
            <peer ref="org_a.p2" />
        </t>
        <t threshold="1" >
            <peer ref="org_b.p1" />
            <peer ref="org_b.p2" />
        </t>
    </t>
</endorsementPolicy>
<network>
    <org id="org_a">
        <peer id="org_a.p1"/>
        <peer id="org_a.p2"/>
    </org>
    <org id="org_b">
        <peer id="org_b.p1"/>
        <peer id="org_b.p2"/>
    </org>
</network>
<requirement>
<faultTolerance>
    <org ref="org_a" num="1" />
    <org ref="org_b" num="1" />
</faultTolerance>
</requirement>
</ep-checker>
```

In this example code, the endorsement policy, the network node structure, and the fault tolerance requirements are defined using XML. Upon pressing the verification button (or some other mechanism for triggering execution of the SMT solver), the system then generates the output 420 based on the verification. For example, the output 420 may include a verification status 422 which provides pass/fail information of different fault tolerance requirements, and a counter-example 424 when at least one requirement fails. The counter-example may provide suggestions on how to change the network structure, the endorsement policy, and/or the like, for satisfying the fault tolerant requirements.

CFT is the most basic level of the fault tolerance, while BFT requires handling of more wider range of faults. Precisely speaking, Byzantine faults include any type of faults, but the focus of this invention is the value faults since an endorsement policy is designed to handle the tolerance to the value faults and the crash faults. Other types of faults (such as faults related to timing and identity) are handled by the common part of the blockchain platform with some restrictions.

For example, assume B={true; false} which is the set of the Boolean values, and N be the set of a natural number. Then, a state of a node observed from a policy verifier may be defined as follows.

$$s=(s.e, s.v) \in \mathbb{B} \times \mathbb{B}$$

Here s.e and s.v are the components of s, where s.e$\in \mathbb{B}$: indicates whether a result of the transaction execution exists or not, and s.v$\in \mathbb{B}$: is the value of the result of the transaction execution. For example, s=(true; true) corresponds to the normal state, (false; false) corresponds to a crash state, and (true; false) corresponds to a value fault state of a node. A single Boolean variable may be used to represent the value of the result of the transaction execution although an execution result could be any value. This is because a threshold function of an endorsement policy only takes into account whether the values coincide or not. In this case, the worst case where a wrong value is accepted corresponds to the case that all the wrong values are the same.

The system may include both network faults and node faults into the above formalization. For example, the state (false; false) can also represent a network fault where a node cannot return a value of a transaction execution result due to a network disconnection. The system may not consider the state transition of the nodes here because it may be assumed that the dynamic part of the consensus protocol including the ordering is handled by the blockchain infrastructure and thus not customizable by an application developer. Therefore, each transaction may be treated independently and the consensus on the execution result of a transaction as a single-step process.

A blockchain network is usually required to have fault tolerance. The fault tolerance is a requirement that all the correct nodes can make a consensus even if there exist up to f$\in \mathbb{N}$ faulty nodes in the network. There are several types of fault tolerance constraints including global fault tolerance, organization-level fault tolerance, and tolerance to include faults. Global fault tolerance provides a constraint on the number of nodes in a network that can be faulty. Organization-level fault tolerance provides a constraint on the number of nodes in an organization that can be faulty. Furthermore, tolerance to colluded faults is necessary where organizations do not trust each other in a blockchain network. In this case, it is not enough that all organizations satisfy the organization-level fault tolerance because there is a possibility that some nodes in the same organization may collude with one another. Therefore, the constraint on organization-level faults can be relaxed to allow some organizations to have more than the allowed organization-level faults.

Up to this section, we have identified several types of requirements on the fault tolerance. Next, one needs to verify the safety and the liveness properties of the blockchain network with a given endorsement policy and a fault tolerance requirement. Safety is a property that all the correct nodes agree with a correct execution result whenever the endorsement policy is met even in the existence of the faulty nodes which we want to tolerate. Liveness is a property that the given endorsement policy is eventually met even in the existence of the faulty nodes to be tolerated.

However, it is not practical to require the liveness property in all cases such as certain colluded cases. This is because there is a tradeoff between the safety and the liveness, and it is difficult to define an endorsement policy which satisfies both the liveness and the safety if there are too many faulty nodes. For example, the higher the threshold parameter the easier it is to satisfy the safety properties but the more difficult it is to satisfy the liveness properties since we can tolerate only a certain amount of nodes to be faulty. In many blockchain applications, the safety property is more important than the liveness property. In such a case, one will verify the safety with any of global fault tolerance, organizational tolerance, and tolerance to colluded faults, but one may use only global fault tolerance and/or organization fault tolerance for liveness verification.

It is possible to verify the fault tolerance requirements by inputting an assertion of the safety and liveness into a satisfiability problem solver and checking its satisfiability. Since the safety property and the liveness property both contains summations of the states and comparisons between integers, one can use an SMT solver which supports linear integer arithmetic for checking the satisfiability.

An overview of the XML schema of the input model is described in this section. To reduce the modeling cost, only the variable elements among applications appear in a model. Variable elements may include a network tag in which a b blockchain network structure is defined. This structure may include a hierarchy of organizations and nodes within the organizations. Each node or organization has an unique ID. This indicates that the numbers of nodes and organizations are fixed and determined from the input model.

Another variable element is the endorsement policy tag. The syntax of the endorsement policy may be directly mapped to XML. One can specify an endorsement policy which is a composite function. The values of the threshold parameters that appear in the threshold functions must be given in the input model. Although the syntax may form a tree structure, it is allowed to specify a node multiple times in an endorsement policy in order to comply with the syntax of that of current Hyperledger Fabric.

Another variable element is the requirement tag. Here, a type of fault tolerance such as global, organizational, tolerance to colluded faults, etc., may be specified. The numbers of tolerated nodes are also specified as parameters, and the values must be assigned to those parameters in the input model. An example of the input model is shown in the code listed above.

Next, the overview of the transformation rule (a stylesheet in XSLT) which converts the input XML model to an SMT script is described. In this example, a node ID is converted into a variable declaration of endorsement type. This type is a tuple of two Boolean variables, which expresses the fault state of a node. For example, <peer id="org_a.p1"/> (a definition of a node) is converted into the following SMT Lib 2.0 script: (declare-const org_a.p1 Endorsement). In addition, a requirement on the fault tolerance is expanded into a form. These formulas are embedded to the arguments of assert command and regarded as constraints on the fault states of the nodes to be explored. In this conversion, an expression of summing up the true values in a set of Boolean variables is needed in the output SMT script. This is done by expanding the summation to a call of a predefined multi-term addition function. In addition, a description of an endorsement policy in the input model is expanded to a composite of the threshold function.

Figure 4C:
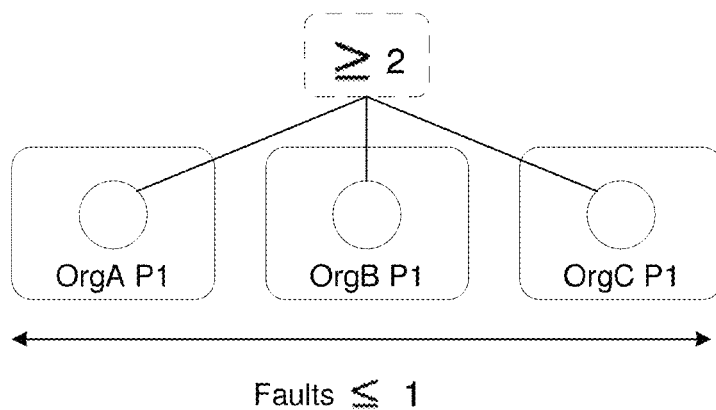
FIG. 4C is a diagram illustrating a correct endorsement policy according to example embodiments.
Figure 4D:
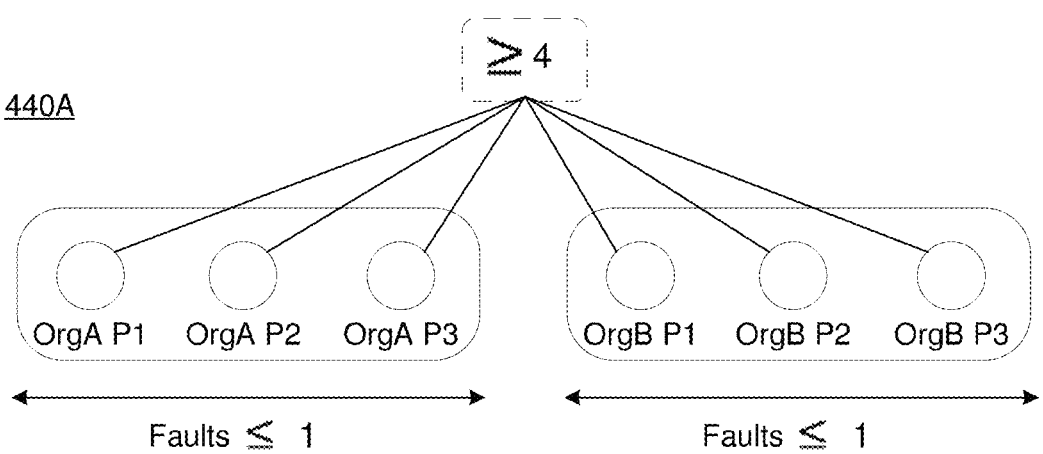
FIG. 4D is a diagram illustrating a failed endorsement policy according to example embodiments.
Figure 4D:
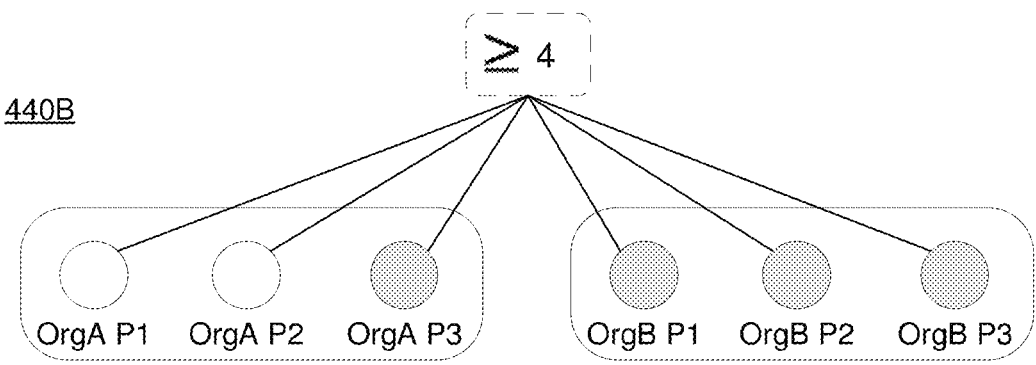

FIG. 4C illustrates an conceptual example 430 of an endorsement policy that satisfies requirements, and FIG. 4D illustrates a conceptual example 440A of an endorsement policy that does not satisfy requirements and a counter-example 440B that does satisfy requirements. In these examples, an empty circle indicates a node, a round rectangle indicates an organization, an upper rectangle with a less-than or equal to sign, or a greater than or equal to sign indicates a threshold function, and a line that connects the threshold function to the nodes is an argument of the threshold function. Furthermore, the line with arrows below is an indicator of the number of faulty nodes that can be tolerated.

In the example of the design 430 in FIG. 4C, the safety and liveness properties are satisfied by the endorsement policy. Here, the number of nodes is three, the threshold requirement for endorsement is two or more, and the number of tolerated faulty nodes is one or less. However, in the design 440A in FIG. 4C, the safety and liveness properties are not satisfied by the endorsement policy. Here, the number of nodes is six, the number of organization is three, the threshold requirement for endorsement is four or more, and the number of tolerated faulty nodes is 1 or less for each organization. In this example, the safety in tolerance to colluded faults has failed. Therefore, the system proposes a modified design 440B which provides a design that satisfies the safety in tolerance to colluded faults.

Figure 5:
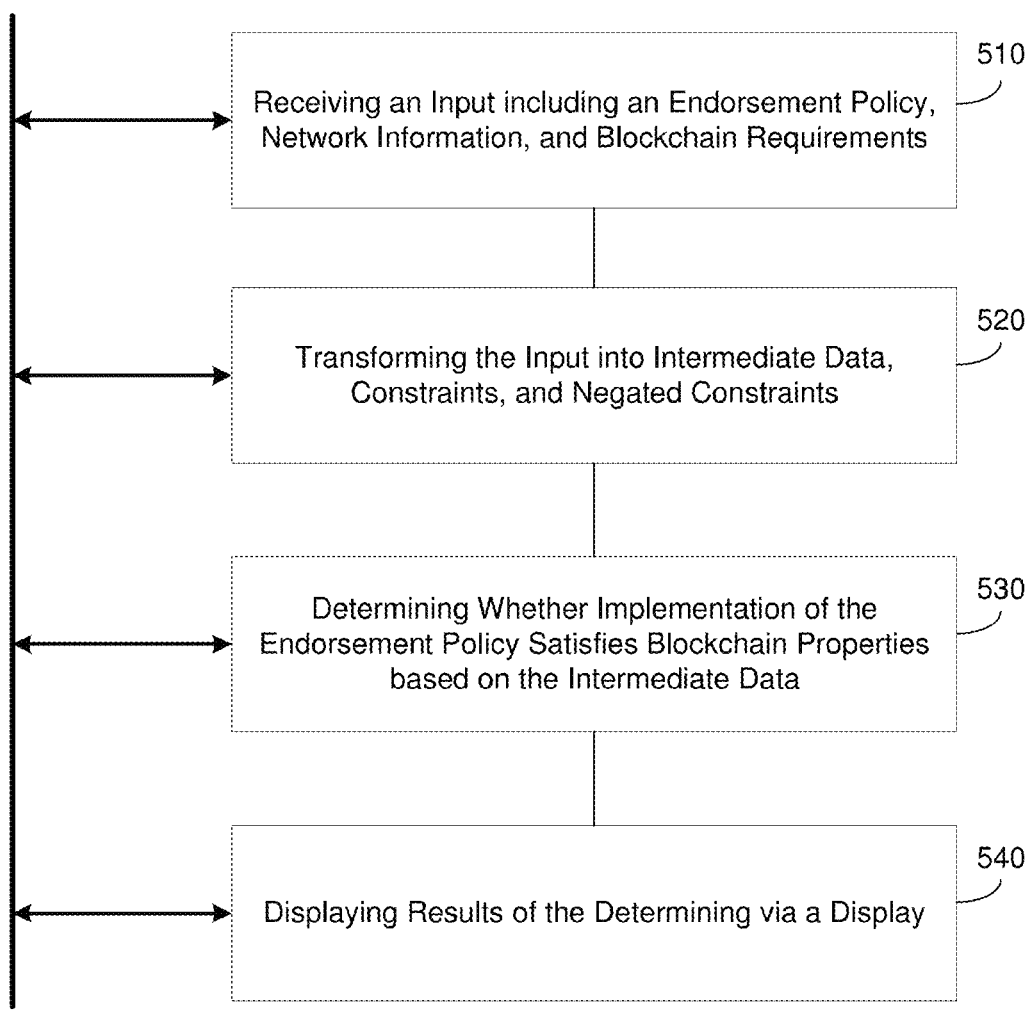
FIG. 5 is a diagram illustrating a method for verifying a blockchain endorsement policy according to example embodiments.

FIG. 5 illustrates a method 500 of according to example embodiments. For example, the method 500 may be performed by a blockchain peer node that may be a computing system. As another example, the method 500 may be performed by an off-chain system such as a server, a user device, a combination of devices, and the like. In some embodiments, the method 500 may be performed by a combination of any of the systems.

Referring to FIG. 5, in 510 the method may include receiving an input comprising an endorsement policy, a structure of a blockchain network, and properties for a blockchain. The properties may include requirements for fault tolerance such as safety, liveness, and the like. The endorsement policy may include a consensus rule as to which nodes, how many nodes, specific combination of nodes, weights of nodes, etc., that must endorse a transaction before it can be stored on a blockchain. The network structure may include a description of the nodes, etc., within the system. Each of the endorsement policy, the network structure, and the requirements may be described as a combination of a keyword and parameters, which may be implemented as an XML tag and attributes, respectively.

In 520, the method may include transforming the received input into intermediate data including fault states of nodes of the blockchain network, constraints on the nodes by the endorsement policy, and negative constraints on the nodes by the blockchain properties. For example, the transforming may include transforming a set of nodes in the blockchain network into state variables which describe fault states of the respective nodes. Further, the transforming may include transforming the endorsement policy into a set of constraints on the state variables and transforming the properties of the blockchain such as liveness and safety into a negation of constraints on the state variables.

In 530, the method may include determining whether the endorsement policy satisfies the blockchain requirements based on the intermediate data. For example, the determining may be performed via execution of a satisfiability modulo theories (SMT) solver on the intermediate data. In 540, the method may include displaying results of the determination via a display screen. For example, the outputting may include outputting a pass/fail message with respect to the endorsement policy. In some embodiments, the outputting may include outputting one or more counter-examples indicating how node faults do not meet the requirements of the blockchain.

In some embodiments, the method may transform the endorsement policy into (i) a constraint which indicates the existence of a consensus, and (ii) a constraint which indicates whether the value on which the consensus is made is correct or not. For example, the method may negate the constraint (i) when the computing system determines whether the blockchain system has the liveness property and, negate the constraint (ii) when the computing system determines whether the blockchain system has the safety property. In some embodiments, the method may determine whether the endorsement policy satisfies the requirements of the blockchain via execution of a satisfiability modulo theories (SMT) solver on the given variables and the constraints. For example, the method may transform the endorsement policy and the requirements for degrees of faults to be tolerated into constraints which includes linear arithmetic of the numbers of state variables which have a specific value in a subset of the state variables.

Figure 6A:
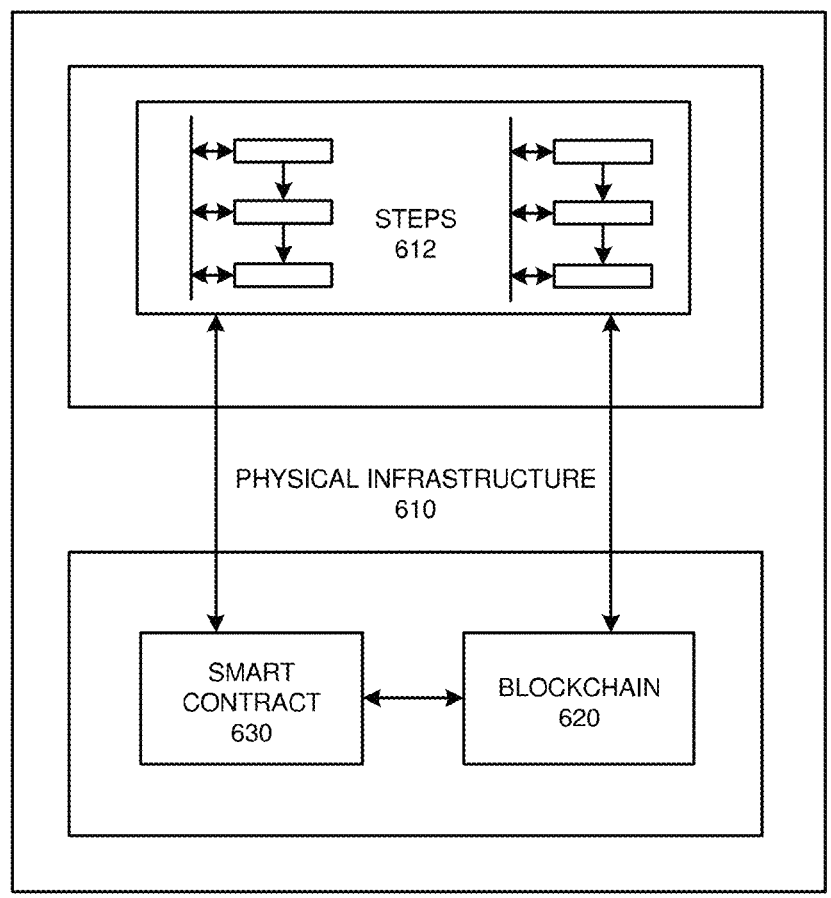
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps 612 may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
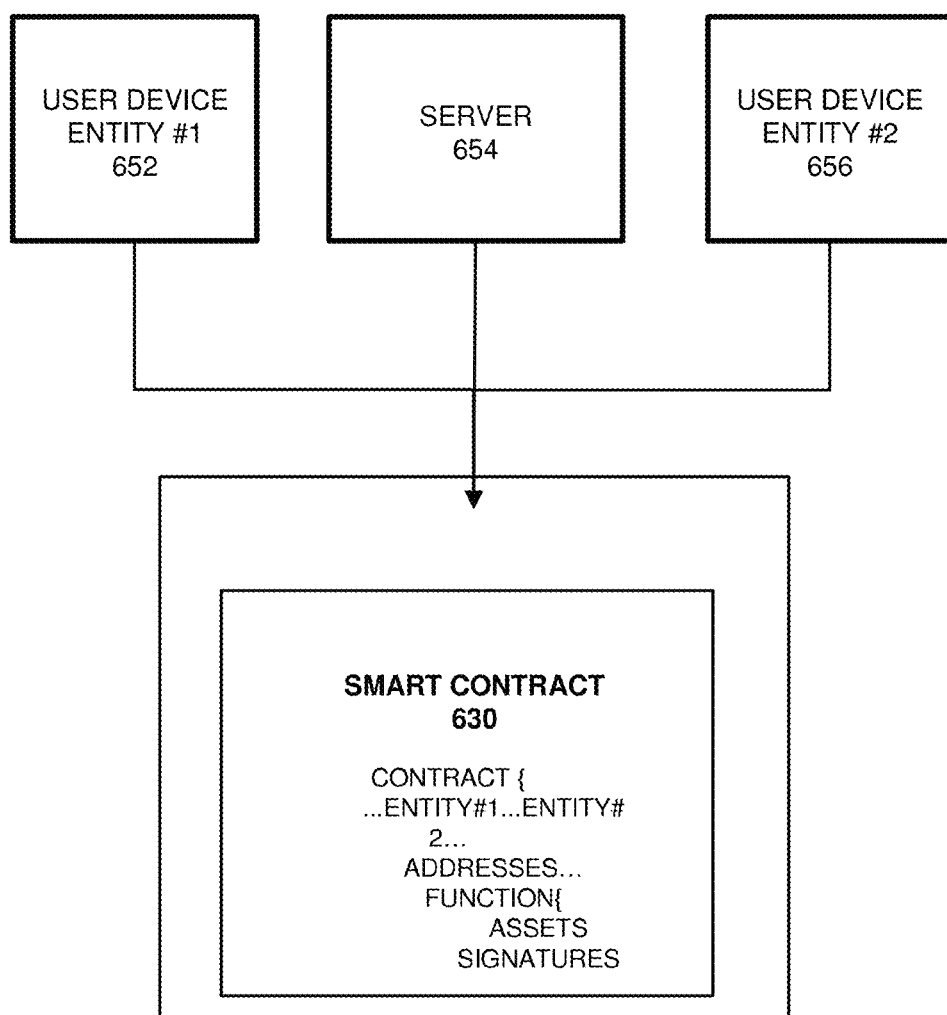
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a multi-party process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

Figure 6C:
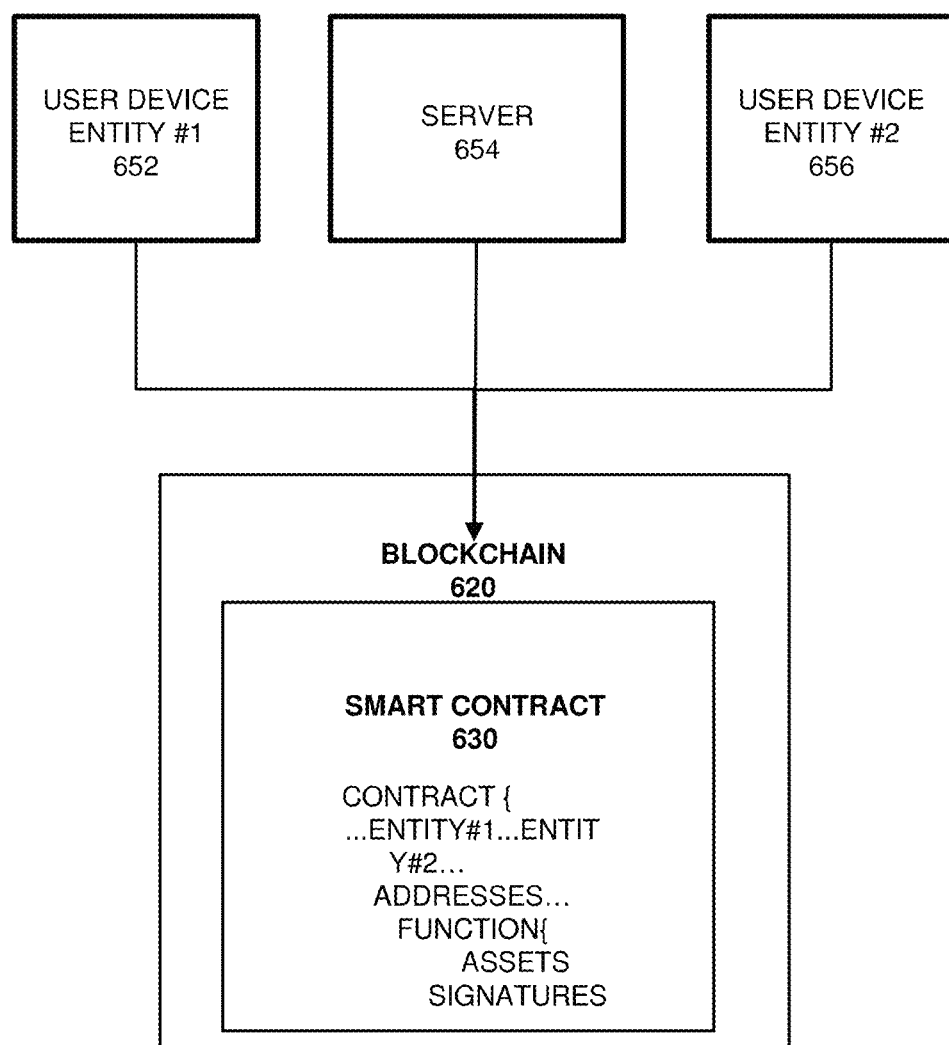
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a modified data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
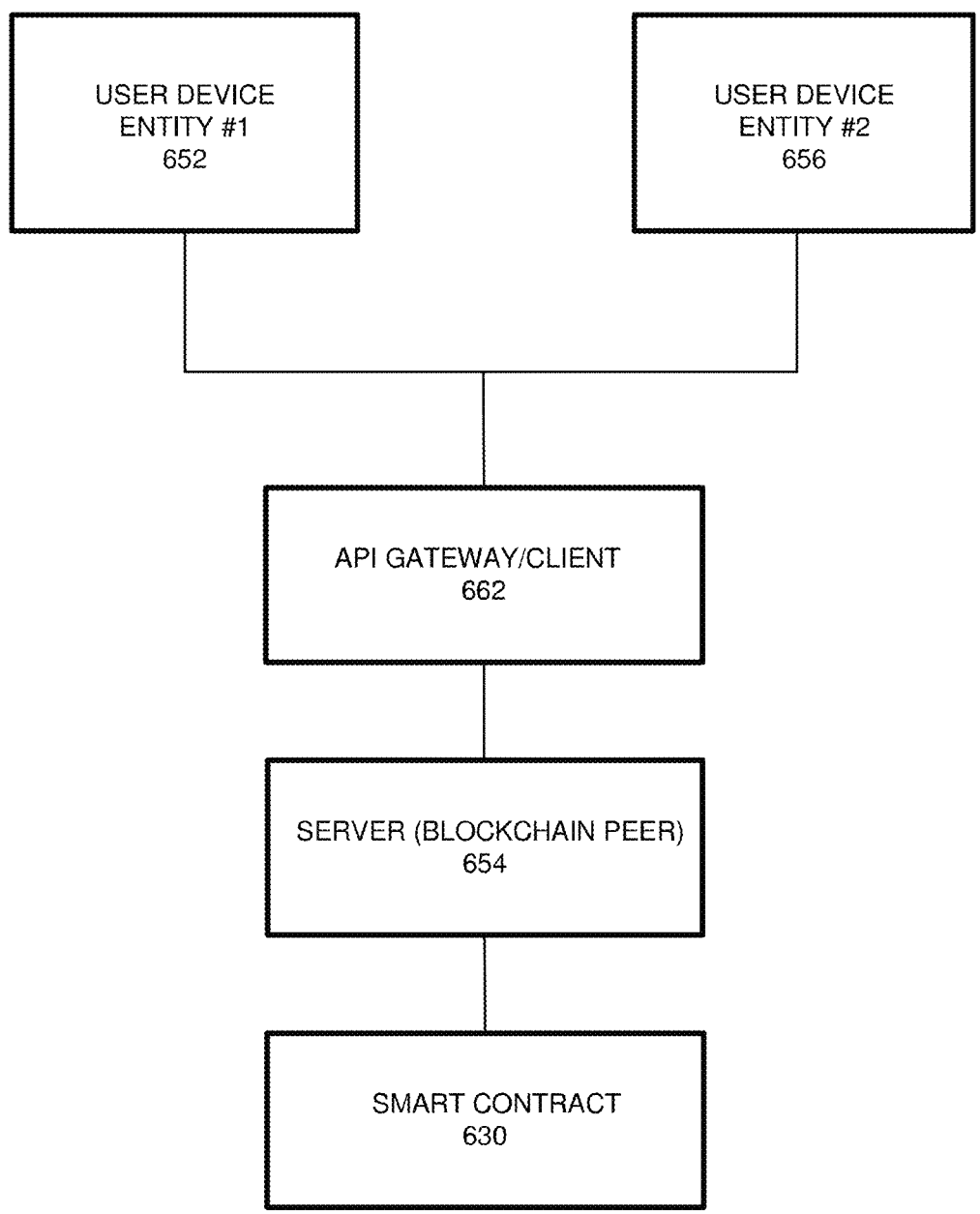
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a key value store) within a distributed ledger allowing clients 652 and 656 to query data on the world state as well as submit transactions into the blockchain network where, depending on the smart contract 630 and endorsement policy, endorsing peers will run the smart contracts 630.

Figure 7A:
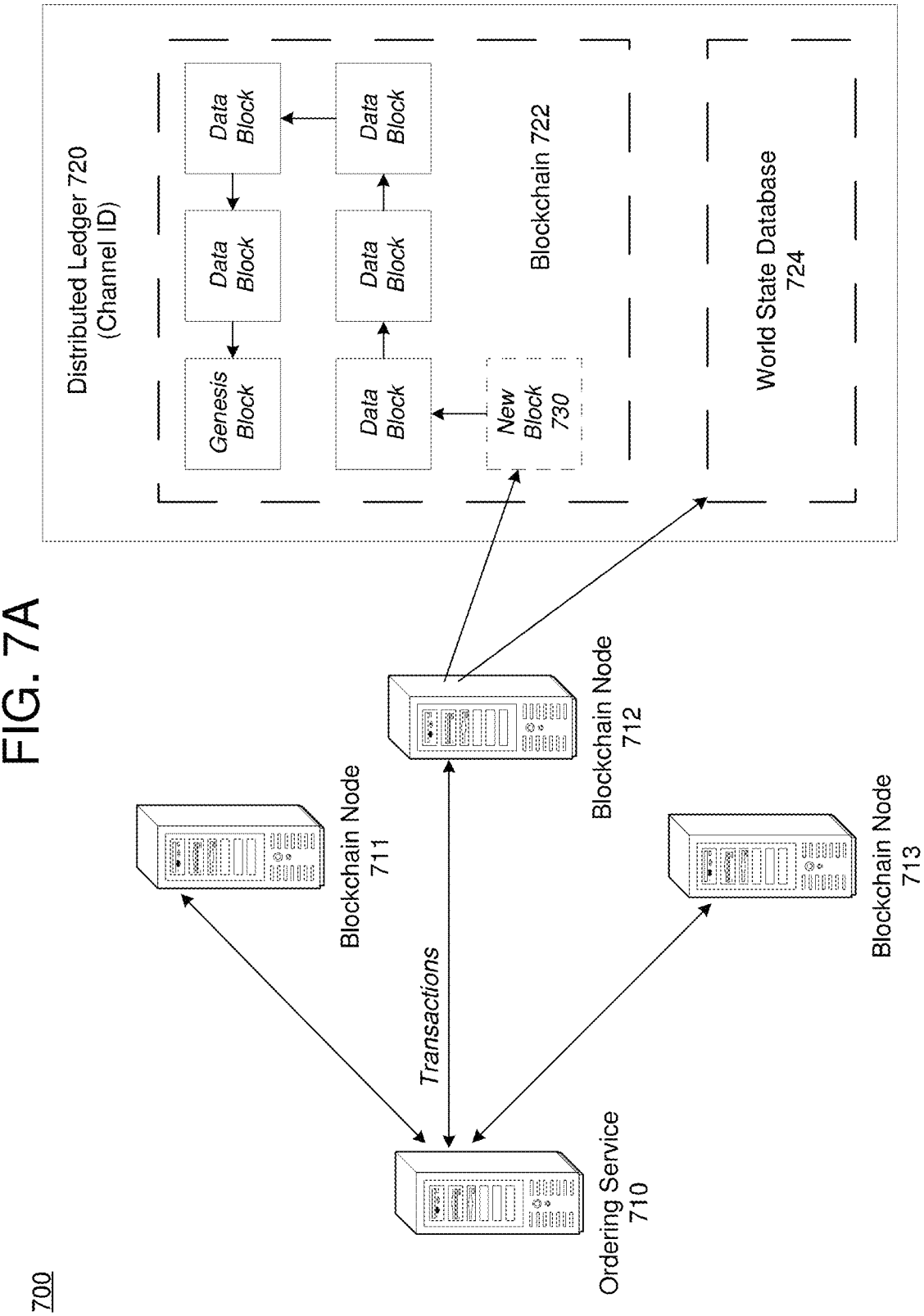
FIG. 7A is a diagram illustrating a process of a new block being added to a blockchain ledger, according to example embodiments.
Figure 7B:
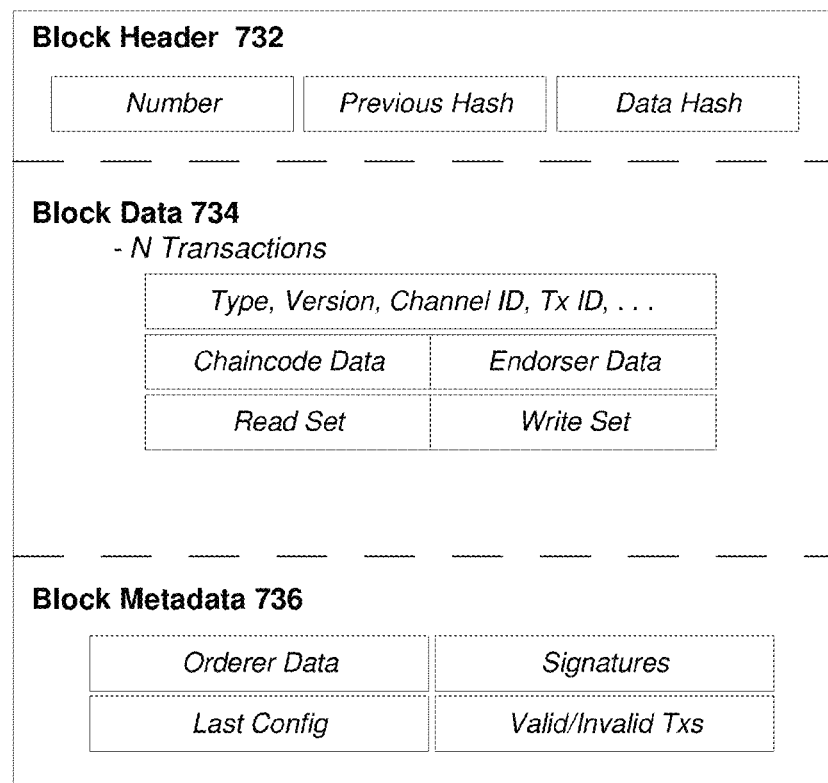
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both. As described herein, transactions may include send events, receive events, storage events, and the like of a multi-party process that is carried out between multiple untrusted organizations.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. For an authentication, the endorsing node may attempt to decrypt a hashed modified data file using a public key of the node that performed the hash. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a crypto-currency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
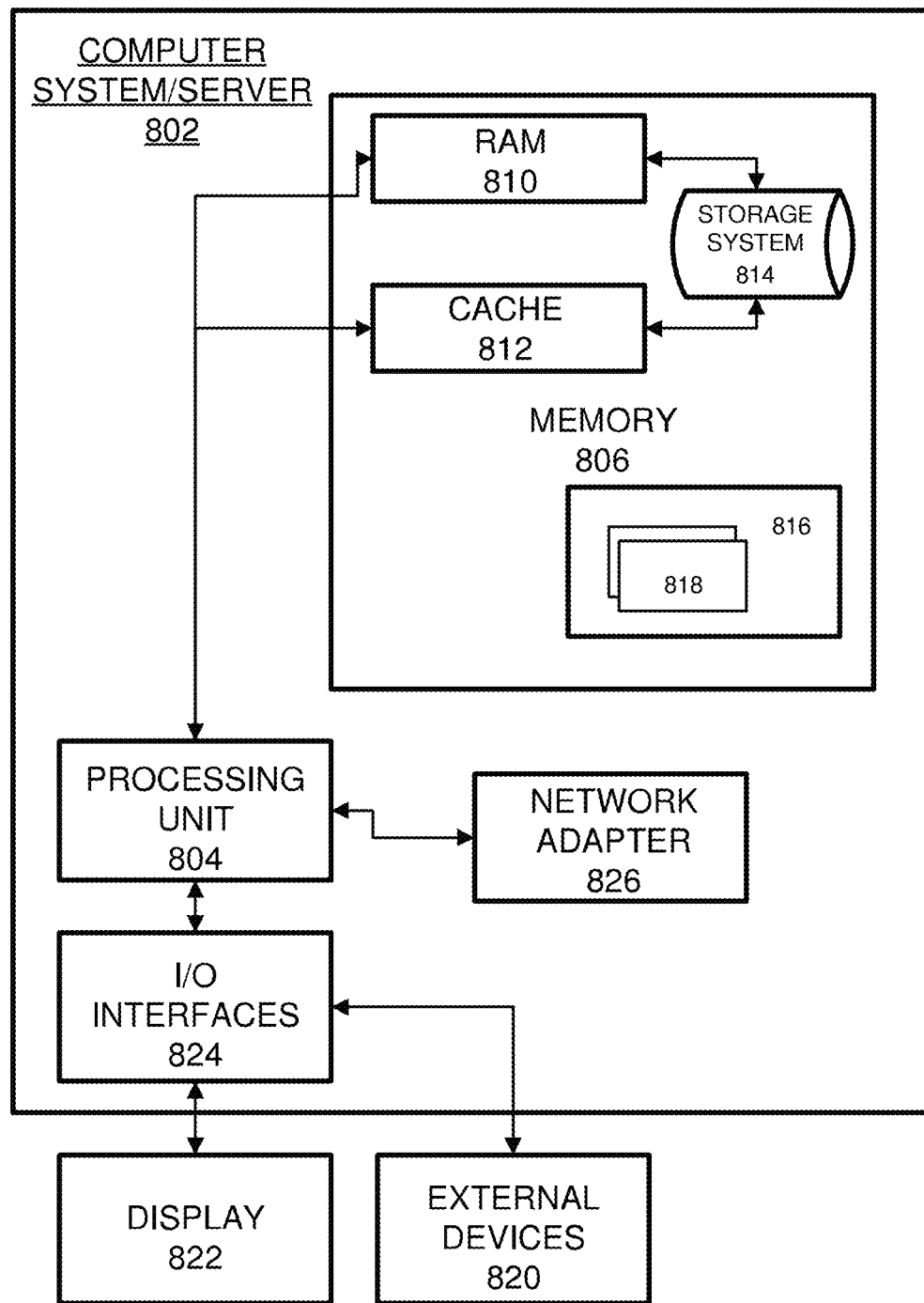
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform the method shown and described with respect to FIG. 5.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a storage configured to store an input comprising an endorsement policy, a structure of a blockchain network, and requirements for degrees of faults; and
   a processor configured to
   transform the input into a script that comprises a set of variable declarations which define a state space and constraints which constrain the state space,
   execute a satisfiability module theory (SMT) solver on the script which verifies whether the endorsement policy satisfies the requirements for the degrees of faults based on possible fault states of nodes in the blockchain network which are associated with the endorsement policy, and
   display results of the verification by the SMT solver via a display screen;
   wherein the execution of the SMT solver verifies the endorsement policy based on Byzantine fault tolerance properties of the nodes.

2. The computing system of claim 1, wherein the Byzantine fault tolerance properties of the nodes includes one or more of liveness requirements and safety requirements.

3. The computing system of claim 1, wherein the processor is configured to transform a set of nodes in the blockchain network into state variables in the script which describe fault states of the respective set of nodes.

4. The computing system of claim 3, wherein the processor is further configured to transform the endorsement policy into a set of constraints on the state variables.

5. The computing system of claim 4, wherein the processor is further configured to transform the endorsement policy into (i) a constraint which indicates the existence of a consensus, and (ii) a constraint which indicates whether a value on which the consensus is made is correct or not.

6. The computing system of claim 3, wherein the processor is further configured to transform the requirements of the degree of faults into a set of constraints on the state variables.

7. The computing system of claim 1, wherein the processor is configured to output a pass/fail message with respect to the endorsement policy.

8. The computing system of claim 7, wherein the processor is further configured to output a counter-example that indicates how node faults do not meet the requirements of the blockchain.

9. A method comprising:
   receiving an input comprising an endorsement policy, a structure of a blockchain network, and requirements for degrees of faults;
   transforming the received input into a script that comprises a set of variable declarations which define a state space and constraints which constrain the state space;
   executing a satisfiability module theory (SMT) solver on the script which verifies whether the endorsement policy satisfies the requirements for the degrees of faults based on possible fault states of nodes in the blockchain network that are associated with the endorsement policy; and
   displaying results of the verification via a display screen;
   wherein the execution of the SMT solver verifies the endorsement policy based on Byzantine fault tolerance properties of the nodes.

10. The method of claim 9, wherein the Byzantine fault tolerance properties of the nodes includes one or more of liveness requirements and safety requirements.

11. The method of claim 9, wherein the transforming comprises transforming a set of nodes in the blockchain network into state variables in the script which describe fault states of the respective set of nodes.

12. The method of claim 11, wherein the transforming comprises transforming the endorsement policy into a set of constraints on the state variables.

13. The method of claim 12, wherein the transforming comprises transforming the endorsement policy into (i) a constraint which indicates the existence of a consensus, and (ii) a constraint which indicates whether a value on which the consensus is made is correct or not.

14. The method of claim 11, wherein the transforming comprises transforming the requirements of the degree of faults into constraints on the state variables.

15. The method of claim 9, wherein the outputting comprises outputting a pass/fail message with respect to the verification of the endorsement policy.

16. The method of claim 15, wherein the outputting further comprises outputting a counter-example indicating how node faults do not meet the requirements of the blockchain.

17. The non-transitory computer-readable medium of claim 15, wherein the Byzantine fault tolerance properties of the nodes includes one or more of liveness requirements and safety requirements.

18. A non-transitory computer readable medium comprising instructions that when read by a processor cause the processor to perform a method comprising:
- receiving an input comprising an endorsement policy, a structure of a blockchain network, and requirements for degrees of faults to be tolerated;
- transforming the received input into a script that comprises a set of variable declarations which define a state space and constraints which constrain the state space;
- executing a satisfiability module theory (SMT) solver on the script which verifies whether the endorsement policy satisfies the requirements for the degrees of faults based on possible fault states of nodes in the blockchain network that are associated with the endorsement policy; and
- displaying results of the verification via a display screen;
- wherein the execution of the SMT solver verifies the endorsement policy based on Byzantine fault tolerance properties of the nodes.

* * * * *